(12) United States Patent
Nahm et al.

(10) Patent No.: US 6,593,263 B2
(45) Date of Patent: Jul. 15, 2003

(54) METHOD FOR PREPARING DIELECTRIC CERAMIC COMPOSITIONS

(75) Inventors: Sahn Nahm, Seoul (KR); Chang Hak Choi, Seoul (KR); Jung In Yang, Seoul (KR); Jun Hwan Jeong, Inchon (KR); Byung Kyu Kim, Seoul (KR); Hwack Joo Lee, Daejeon (KR)

(73) Assignee: Amotech Co., Ltd., Kyungki-do (KR)

( * ) Notice: Subject to any disclaimer, the term of this patent is extended or adjusted under 35 U.S.C. 154(b) by 238 days.

(21) Appl. No.: 09/865,437

(22) Filed: May 29, 2001

(65) Prior Publication Data

US 2002/0025902 A1 Feb. 28, 2002

(30) Foreign Application Priority Data

Aug. 24, 2000 (KR) ......................................... 2000-49374

(51) Int. Cl.$^7$ ............................................. C04B 35/495
(52) U.S. Cl. ........................................................ 501/135
(58) Field of Search .......................................... 501/135

(56) References Cited

U.S. PATENT DOCUMENTS 3,464,785 A * 9/1969 Galasso .................. 252/519.14
4,121,941 A * 10/1978 Kawashima et al. ........ 501/135
4,897,374 A * 1/1990 Matsumoto et al. ........ 501/134

* cited by examiner

*Primary Examiner*—David Brunsman
(74) *Attorney, Agent, or Firm*—Rosenberg, Klein &Lee

(57) ABSTRACT

The present invention discloses a method for preparing $Ba(Zn_{1/3}Ta_{2/3})O_3$ dielectric ceramic compositions. In accordance with the present invention, by adding a small amount of $Al_2O_3$, $Ga_2O_3$, $ZrO_2$, or $TiO_2$, which can generate metal ion having an atomic value of 3+ or 4+, the problems occurring during the sintering of BZT due to the volatilization of Zn can be solved. Also, the BZT dielectrics obtained from the present method have a Q value of 200,000, which is higher than the pure BZT, a dielectric constant of 28.5 or more and a resonant frequency temperature coefficient of near 0.

4 Claims, 3 Drawing Sheets

METHOD FOR PREPARING DIELECTRIC CERAMIC COMPOSITIONS

BACKGROUND OF THE INVENTION

1. Field of the Invention

The invention relates to a method for preparing dielectric ceramic compositions having a formula represented by $Ba(Zn_{1/3}Ta_{2/3})O_3$ for use in a filter of a base station for mobile and satellite communication, and more particularly a method for preparing dielectric ceramic compositions having a formula represented by $Ba(Zn_{1/3}Ta_{2/3})O_3$ (hereinafter referred as BZT dielectrics or BZT dielectric compositions), which have a dielectric constant of at least 28.5, a Q value of at least 200,000, and a stable resonant frequency temperature coefficient of ±2.

2. Description of the Related Art

The high frequency dielectrics are essential material forming parts used in a duplexer and a band-pass filter for a wireless telephone or a terminal of mobile communication, radio LAN, satellite broadcasting, etc. However, there are demands for development of high frequency dielectrics desirably to have a high dielectric constant, a high Q value, and a temperature coefficient of near 0.

Typical dielectric substances having a high Q value and a high dielectric constant include complex perovskite dielectrics such as BZT, etc. BMT has a high Q value of about 200,000, however it has a dielectric constant lower than 30 of BZT. BZT is known to have a dielectric constant of 30 or more as well as a high Q value and a resonant frequency temperature coefficient of near 0. Therefore, it attracts public attention as promising dielectrics.

However, BZT has disadvantages in that it has difficulty in production since Zn volatilizes in a sintering process. Further, good dielectric properties cannot be attained. In order to solve such problems, conventionally three kinds of methods described below were used.

The first method comprises a step of sintering pure BZT at a high temperature of 1,400° C. to 1,550° C. for at least 60 hours. However, there is difficulty in sintering for such a long time. Moreover, although the dielectric constant and resonant frequency temperature coefficient of the produced dielectrics are good, the Q value is low as 100,000. Therefore, the BZT cannot be made of use in practice.

The second method comprises forming a solid solution of BZT and $BaZrO_3$. According to this method, it is possible to reduce the sintering time within 10 hours or less depending on composition of $BaZrO_3$. However, the produced dielectrics have a relatively low Q value of 150,000 although it has a good dielectric constant and resonant frequency temperature coefficient. Therefore, it is also difficult to use this method in practice.

The final method comprises forming a solid solution of BZT and $(Ba_{1-x}Sr_x)(Ga_{1/2}Ta_{1/2})O_3$. The dielectrics produced according to this method have good dielectric properties such as a dielectric constant of 29 to 30, a resonant frequency temperature coefficient of ±5 and a Q value of 200,000 or more. However, the method requires an additional thermal treatment at a temperature of 1,450° C. for a period of long time of 24 hours more after the sintering step at a temperature 1,550° C. for 2 hours. Thus, this method cannot be made of used in practice.

SUMMARY OF THE INVENTION

Therefore, the present invention has been made in order to solve the above-described problems involved in the methods for preparing BZT dielectric ceramic compositions. Now, we have discovered that by adding a metal oxide containing 3+ or 4+ metal ion, which is smaller than or equal to Zn in their sizes, the problems in association with the volatilization of Zn in the process for producing BZT can be overcome.

An object of the present invention is to provide a method for preparing BZT dielectric ceramic compositions, which have good dielectric properties and can be used as material forming a filter for a base station of mobile/satellite communication.

In order to achieve the above object, the present invention provides a method for preparing high frequency $Ba(Zn_{1/3}Ta_{2/3})O_3$ dielectric ceramic composition, which comprises the steps of: mixing $BaCO_3$, $Ta_2O_5$ and ZnO powder and calcining to thereby obtain $Ba(Zn_{1/3}Ta_{2/3})O_3$ powder; adding one of oxide selected from a group consisting of $Al_2O_3$, $Ga_2O_3$, $ZrO_2$, $TiO_2$, and $SnO_2$ powder to the $Ba(Zn_{1/3}Ta_{2/3})O_3$ powder to thereby obtain a powder mixture; and sintering the mixture obtained from the above step.

The feature of the present invention resides in adding one of metal oxide containing 3+ or 4+ ion such as $Al_2O_3$, $Ga_2O_3$, $ZrO_2$, $TiO_2$, and $SnO_2$ powder in a proper amount on the base of the total composition so that the sintering can be effected within a short time at a temperature of 1,500° C. to 1,550° C. provide BZT composition having a high Q value, a high dielectric constant and resonant frequency temperature coefficient of near 0.

Particularly, according to the present invention, it is possible to control the resonant frequency temperature coefficient and dielectric constant by selecting the additive oxide. Further, the sintering time can be reduced and BZT dielectric ceramic composition having good dielectric properties can be prepared.

In accordance with the present invention, firstly $BaCO_3$, $Ta_2O_5$ and ZnO were weighed and mixed together. Then, the resulting mixture was sintered at a temperature of 1,200° C. for 2 hours to synthesize into a BZT dielectric ceramic composition.

The synthesized BZT composition powder was ball-milled and dried. One of oxides selected from a group consisting of $Al_2O_3$, $Ga_2O_3$, $ZrO_2$, $TiO_2$, and $SnO_2$ powder was added.

According to our study, in order to enhance the dielectric properties of the BZT dielectrics, as above-mentioned, the vacant which is generated by volatilization of Zn having a low melting point is to be filled. We discovered that the vacant could be filled with a metal ion having a size smaller than or equal to Zn and a atomic value similar to that of Zn. Zn has an atomic value of 2+ and has a size of 0.08 nm at an ion state. Al has an atomic value of 3+ and a size of 0.057 nm at an ion state, Zr has an atomic value of 4+ and a size of 0.079 nm at an ion state, Ti has an atomic value of 4+ and a size of 0.64 nm at an ion state, and Sn has an atomic value of 4+ and a size of 0.74 nm at an ion state. Therefore, we concluded that ions derived from these atoms would readily substitute for the Zn volatilized.

That is, by adding these metal ions as metal oxide to the dielectric compositions so that they fill the vacant, which is generated by volatilization of Zn having a low melting point, the influence due to the volatilization of Zn can be minimized. Consequently, it is possible to obtain a BZT dielectric with a uniform lattice structure of a high density and sintering characteristics.

The amount of the metal oxides, which is added according to the present invention, is varied on the atomic value of the metal. The metal oxide containing a metal having an atomic value of 3+, such as $Al_2O_3$ and $Ga_2O_3$, is added preferably in an amount of 0.7 to 1.0 mole %. The metal oxide containing a metal having an atomic value of 4+, such as $TiO_2$, $ZrO_2$ and $SnO_2$, is added preferably in an amount of 1.5 to 2.0 mole %.

After adding the metal oxide, the powder mixture is subjected to a sintering step. Preferably, the sintering temperature is at least 1500° C. so that the BZT synthetic powder reacts sufficiently with the metal oxide and exceeds not 1550° C. so as to suppress the volatilization of Zn. The sintering time is controlled not to exceed 10 hours considering the excessive volatilization of Zn.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF THE PREFERRED EMBODIMENTS

Now, a preferred embodiment according to the present invention will be described in detail. $BaCO_3$, $Ta_2O_3$ and ZnO were weighed and well mixed together for 2 hours or more. The mixture was dried, placed in an alumina container and sintered for 2 hours in an electric furnace at a temperature of 1,200° C. to synthesize into a BZT dielectric ceramic composition.

To the synthesized BZT composition powder was added $Al_2O_3$, $Ga_2O_3$, $ZrO_2$, or $TiO_2$ powder in the compositional ratio according to the present invention. This mixture was ball-milled for 24 hours and dried to give a mixture powder. The resulting powder was pressure-molded into a cylindrical specimen (diameter: 16 mm, thickness: 6 to 7 mm) and sintered at a temperature of 1,500° C. to 1,550° C. for 10 hours in the air. After drying, the sintered specimen was measured for the Q value (Q*f) and the resonant frequency temperature coefficient. The dielectric constant was measured according to the parallel metal plate method, in which the measuring conditions include a frequency of 4 to 5 GHz and a temperature of −20 to 80° C.

Figure 1:
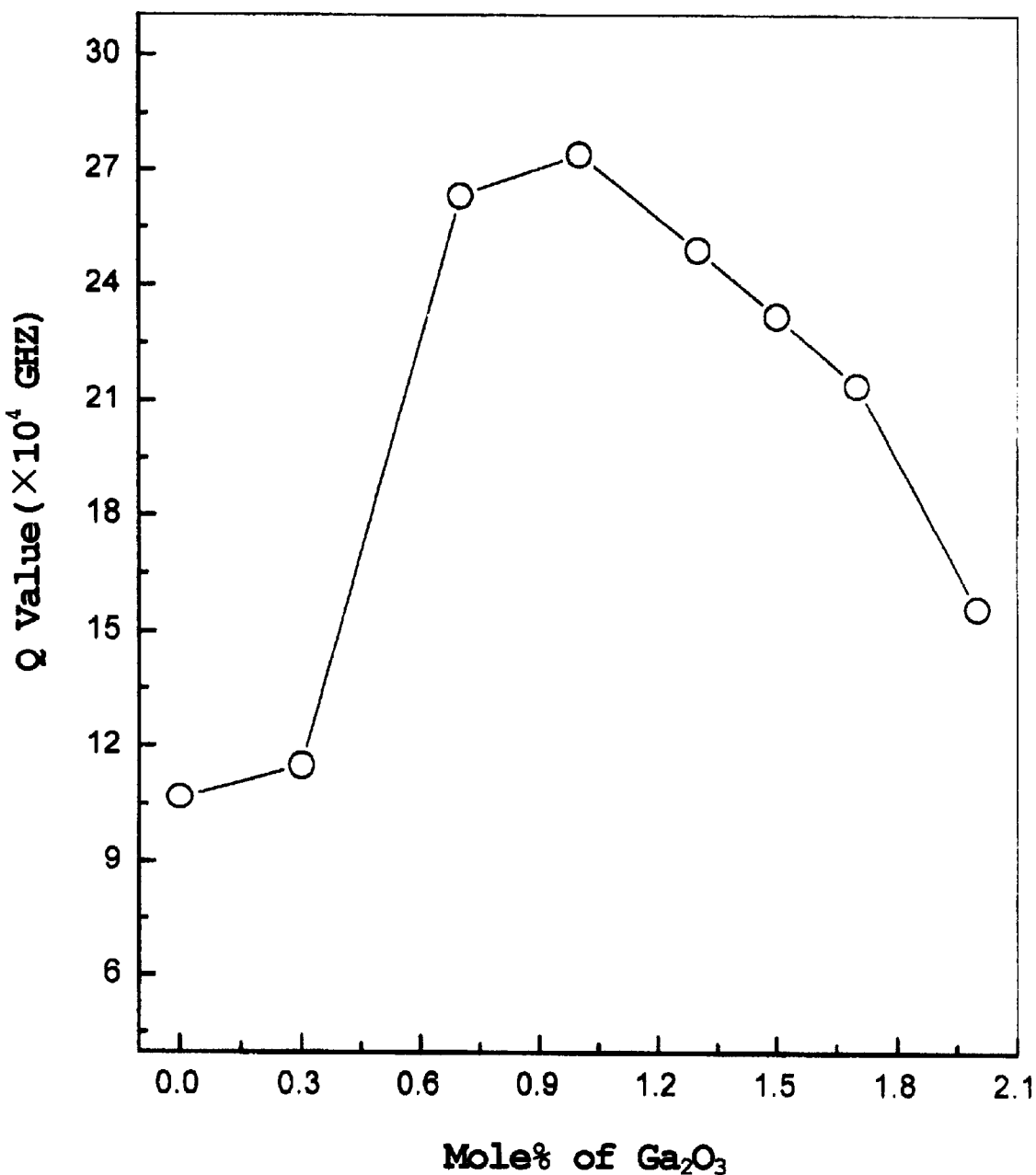
FIG. 1 is a graph showing the change of the Q value with respect to the content of $Ga_2O_3$ in the BZT dielectric, which is sintered at a temperature of 1,550° C. for 10 hours according to the present invention.

FIG. 1 shows the change of the Q value with respect to the content of $Ga_2O_3$ in the BZT dielectric, which is sintered at a temperature of 1,550° C. for 10 hours according to the present invention. In the graph, the pure BZT has a Q value of 100,000. As the content of $Ga_2O_3$ is increased, the Q value increases dramatically, showing a Q value of 250,000 when adding 0.7 mole % of $Ga_2O_3$ and a Q value of 270,000 when adding 1.0 mole % of $Ga_2O_3$. Thus, it is noted that with addition of only a small amount of $Ga_2O_3$ the Q value increased over 200,000.

Figure 2:
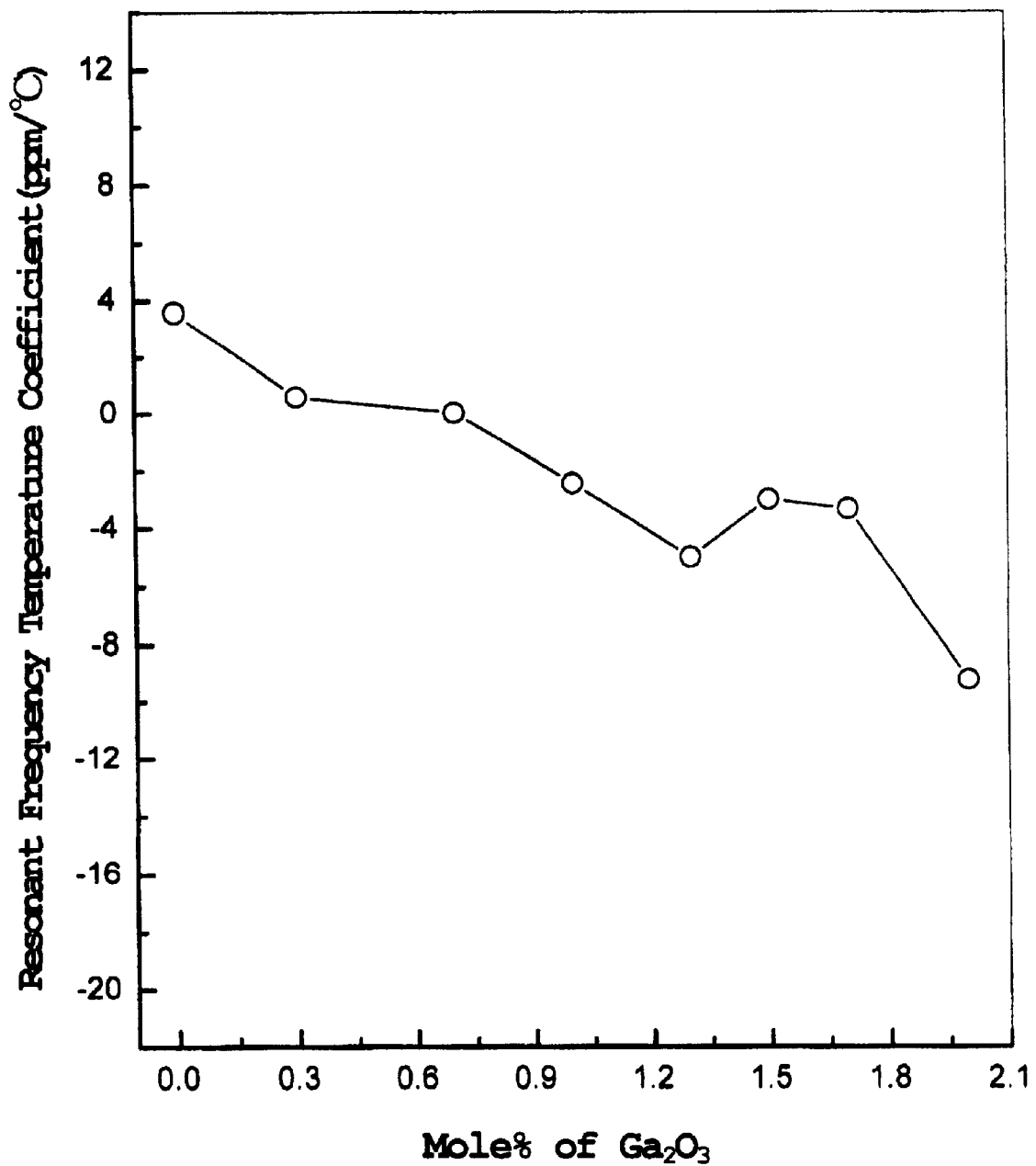
FIG. 2 is a graph showing the change of the resonant frequency temperature coefficient with respect to the content of $Ga_2O_3$ in the BZT dielectric, which is sintered at a temperature of 1,550° C. for 10 hours according to the present invention.

In FIG. 2, it is observed that the composition of pure BZT has a resonant frequency temperature coefficient of 3.5. When 0.7 mole % of $Ga_2O_3$ is added, the temperature coefficient is 0 and when 1.0 mole % of $Ga_2O_3$ is added the temperature coefficient is reduced to −2.0.

Figure 3:
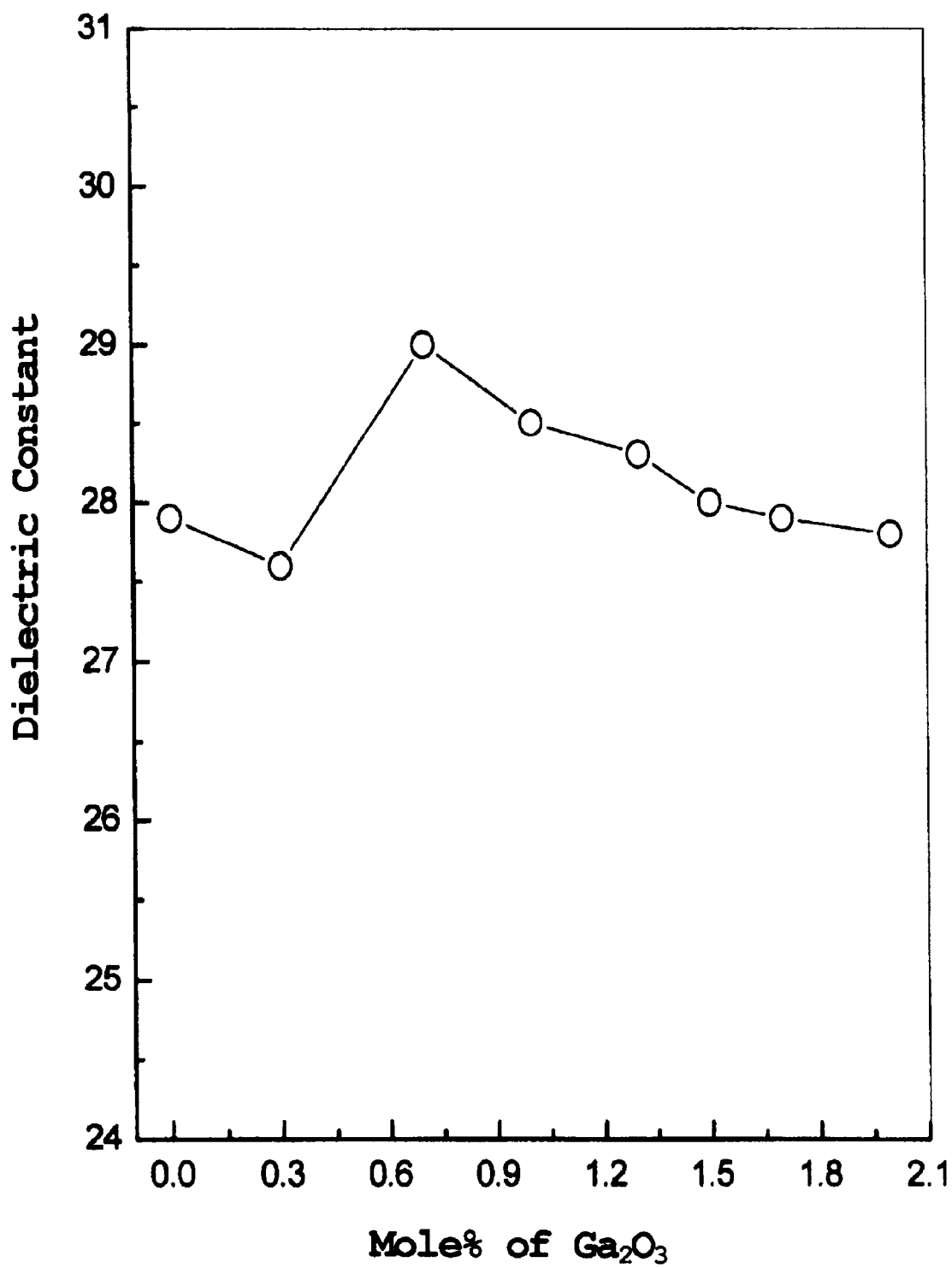
FIG. 3 is a graph showing the change of the dielectric constant with respect to the content of $Ga_2O_3$ in the BZT dielectric composition, which is sintered at a temperature of 1550° C. for 10 hours according to the present invention.

From FIG. 3, it is observed that pure BZT without a metal oxide has a dielectric constant of 28. With addition of a small amount of $Ga_2O_3$, the dielectric constant increases.

As seen from the above-described results, the addition of a small amount of $Ga_2O_3$ enables BZT to be produced within a short time. It is possible to attain good dielectric properties.

The improvement of BZT dielectric properties by the addition of $Ga_2O_3$ according to the present invention can be explained under following grounds. Since ZnO is highly volatile, when sintered at 1,550° C. it can volatilize readily. Therefore, it is difficult to produce BZT. Even if being produced, its microstructure is loose and the density is low, with poor dielectric properties. However, when adding a small amount of $Ga_2O_3$, Ga ion can occupy the vacant, which is generated by volatilization of Zn because its size is similar to that of Zn. Thus, sintering is well accomplished and the produced BZT has a high density and a uniform crystal grain size. Further, the Q value is slightly increased as shown in FIG. 1. Meanwhile, the added amount of $Ga_2O_3$ is increased (over 0.7 mole %), the grain size increases considerably and the Q value is enhanced. It is because liquid phase is formed as a result of the addition of $Ga_2O_3$, which facilitates sintering, thereby increasing the grain size and density and enhancing the Q value. Further, increase of grain size reduces crystal boundaries. As a result, deficiency of crystal boundaries in BZT is reduced and thus the Q value is enhanced. However, if $Ga_2O_3$, is added over 1.0 mole %, the amount of liquid phase is increased excessively. As a result, the dielectric properties are rather deteriorated as shown in FIG. 1.

As described above, the $Ba(Zn_{1/3}Ta_{2/3})O_3$ dielectric ceramic compositions prepared in accordance with the present invention have shows good dielectric properties with the dielectric constant of 28.5, the Q value of 200,000 or more and the resonant frequency temperature coefficient of ±2. Therefore, it can be used as a filter for a base station of mobile and satellite communication. In addition, the method according to the present invention is simple. Accordingly, it is expected that the dielectrics prepared using the present method can distribute considerably to manufacture of the filter of a base station for IMT-2000 (International Mobile Telecommunication 2000) system.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for preparing high frequency $Ba(Zn_{1/3}Ta_{2/3})O_3$ dielectric ceramic composition, which comprises the steps of:

mixing $BaCO_3$, $Ta_2O_3$ and ZnO powder and calcining to thereby obtain $Ba(Zn_{1/3}Ta_{2/3})O_3$ powder;

adding one of oxide selected from a group consisting of $Al_2O_3$, $Ga_2O_3$, $ZrO_2$, $TiO_2$, and $SnO_2$ powder to the $Ba(Zn_{1/3}Ta_{2/3})O_3$ powder to thereby obtain a powder mixture; and sintering the mixture obtained from the above step.

2. The method according to claim 1, wherein $Al_2O_3$ or $Ga_2O_3$ is added in an amount of 0.7 to 1.0 mole % based on the composition.

3. The method according to claim 1, wherein $ZrO_2$, $TiO_2$, or $SnO_2$ is added in an amount of 1.5 to 2.0 mole % based on the composition.

4. The method according to claim 1, wherein the sintering is carried out at a temperature range of 1,500° C. to 1,550° C. for 10 hours or less.

* * * * *